US009939929B2

United States Patent
Nicholson et al.

(10) Patent No.: US 9,939,929 B2
(45) Date of Patent: Apr. 10, 2018

(54) APPARATUS, METHOD, AND PROGRAM PRODUCT FOR ERASING WITH A STYLUS

(71) Applicant: LENOVO (Singapore) PTE, LTD., New Tech Park (SG)

(72) Inventors: John Weldon Nicholson, Cary, NC (US); Joshua Neil Novak, Wake Forest, NC (US); Russell Speight VanBlon, Raleigh, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 112 days.

(21) Appl. No.: 14/639,019

(22) Filed: Mar. 4, 2015

(65) Prior Publication Data
US 2016/0259436 A1    Sep. 8, 2016

(51) Int. Cl.
G06F 3/0354 (2013.01)
G06F 3/041 (2006.01)
G06F 3/038 (2013.01)
G06F 3/0346 (2013.01)

(52) U.S. Cl.
CPC ........ *G06F 3/03545* (2013.01); *G06F 3/0346* (2013.01); *G06F 3/0383* (2013.01); *G06F 3/0416* (2013.01); *G06F 2203/04108* (2013.01)

(58) Field of Classification Search
None
See application file for complete search history.

(56) References Cited

U.S. PATENT DOCUMENTS

| 2014/0085269 | A1* | 3/2014 | Armstrong-Muntner | G06F 3/03545 345/179 |
| 2014/0168177 | A1* | 6/2014 | Mkrtchyan | G06F 3/041 345/179 |
| 2015/0091859 | A1* | 4/2015 | Rosenberg | G06F 3/044 345/174 |
| 2015/0370350 | A1 | 12/2015 | Hunt et al. | |

\* cited by examiner

*Primary Examiner* — Duane N Taylor, Jr.
(74) *Attorney, Agent, or Firm* — Kunzler, PC

(57) ABSTRACT

Apparatuses, methods, and program products are disclosed for erasing with a stylus. By use of a processor, an orientation of a stylus relative to a display is determined. Whether a touch event of the display occurs is determined. An erase function is performed in response to the touch event occurring and the orientation of the stylus being is in a substantially inverted position.

10 Claims, 7 Drawing Sheets

APPARATUS, METHOD, AND PROGRAM PRODUCT FOR ERASING WITH A STYLUS

FIELD

The subject matter disclosed herein relates to styluses and more particularly relates to erasing with a stylus.

BACKGROUND

Description of the Related Art

Information handling devices, such as desktop computers, laptop computers, tablet computers, smart phones, optical head-mounted display units, smart watches, etc., are ubiquitous in society. These information handling devices may use a stylus for receiving input. Using a stylus may facilitate precise input to be provided to the information handling device, among other benefits.

BRIEF SUMMARY

An apparatus for erasing with a stylus is disclosed. A method and computer program product also perform the functions of the apparatus. In one embodiment, the apparatus includes a stylus, a touch-sensitive display, a processor, and a memory that stores code executable by the processor. The code, in various embodiments, determines an orientation of the stylus relative to the touch-sensitive display. In a further embodiment, the code determines whether a touch event of the touch-sensitive display occurs. The code may perform an erase function in response to the touch event occurring and the orientation of the stylus being in a substantially inverted position.

In a further embodiment, the stylus includes a sensor selected from a gyroscope, an accelerometer, an altimeter, and a wireless transceiver. In some embodiments, the code includes code that receives data from a sensor of the stylus. The data is used in determining the orientation of the stylus. In one embodiment, the code that determines whether the touch event occurs further includes code that determines whether the stylus is within a predetermined distance from the touch-sensitive display.

In another embodiment, the stylus includes a first end and a second end. The first end enabling a write function in response to the orientation of the stylus being in a substantially non-inverted position, and the second end enabling the erase function in response to the orientation of the stylus being in the substantially inverted position. In a further embodiment, the substantially non-inverted position includes the first end being closer to the touch-sensitive display than the second end, and the substantially inverted position includes the second end being closer to the touch-sensitive display than the first end. In some embodiments, the code includes code that displays an indication to the touch-sensitive display indicating that the erase function is being performed.

A method for erasing with a stylus, in one embodiment, includes determining, by use of a processor, an orientation of a stylus relative to a display. In some embodiments, the method includes determining whether a touch event of the display occurs. In a further embodiment, the method includes performing an erase function in response to the touch event occurring and the orientation of the stylus being in a substantially inverted position.

In some embodiments, the method includes receiving data from a sensor. In such an embodiment, the data is used in determining the orientation of the stylus. In another embodiment, receiving data from the sensor further includes receiving data from the sensor selected from the group consisting of gyroscope data, accelerometer data, altimeter data, and wireless transceiver data. In some embodiments, determining whether the touch event occurs includes determining whether the stylus is within a predetermined distance from the display.

In some embodiments, determining the orientation of the stylus comprises determining whether a first end of the stylus comprising writing circuitry is closer to the display than a second end of the stylus. In a further embodiment, the method includes determining whether the stylus is in the substantially inverted position.

In certain embodiments, the method includes providing an indication that the erase function is being performed. In such embodiments, providing the indication that the erase function is being performed includes displaying the indication on the display. In some embodiments, wherein determining whether the touch event of the display occurs further includes determining if a back and forth motion of the stylus occurs.

In one embodiment, a program product includes a computer readable storage medium that stores code executable by a processor. The executable code, in certain embodiments, includes code to perform determining an orientation of a stylus relative to a display. In a further embodiment, the executable code includes code to determine whether a touch event of the display occurs. The executable code, in some embodiments, includes code to perform an erase function in response to the touch event occurring and the orientation of the stylus being in a substantially inverted position.

In certain embodiments, the code further includes code to perform receiving data from the stylus. In such embodiments, the data may be used in determining the orientation of the stylus. In some embodiments, the code that performs determining whether the touch event occurs further performs determining whether the stylus is within a predetermined distance from the display. In further embodiments, wherein the code further includes code to determine whether a first end of the stylus comprising writing circuitry is in a substantially non-inverted position and whether a second end of the stylus is in the substantially inverted position.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
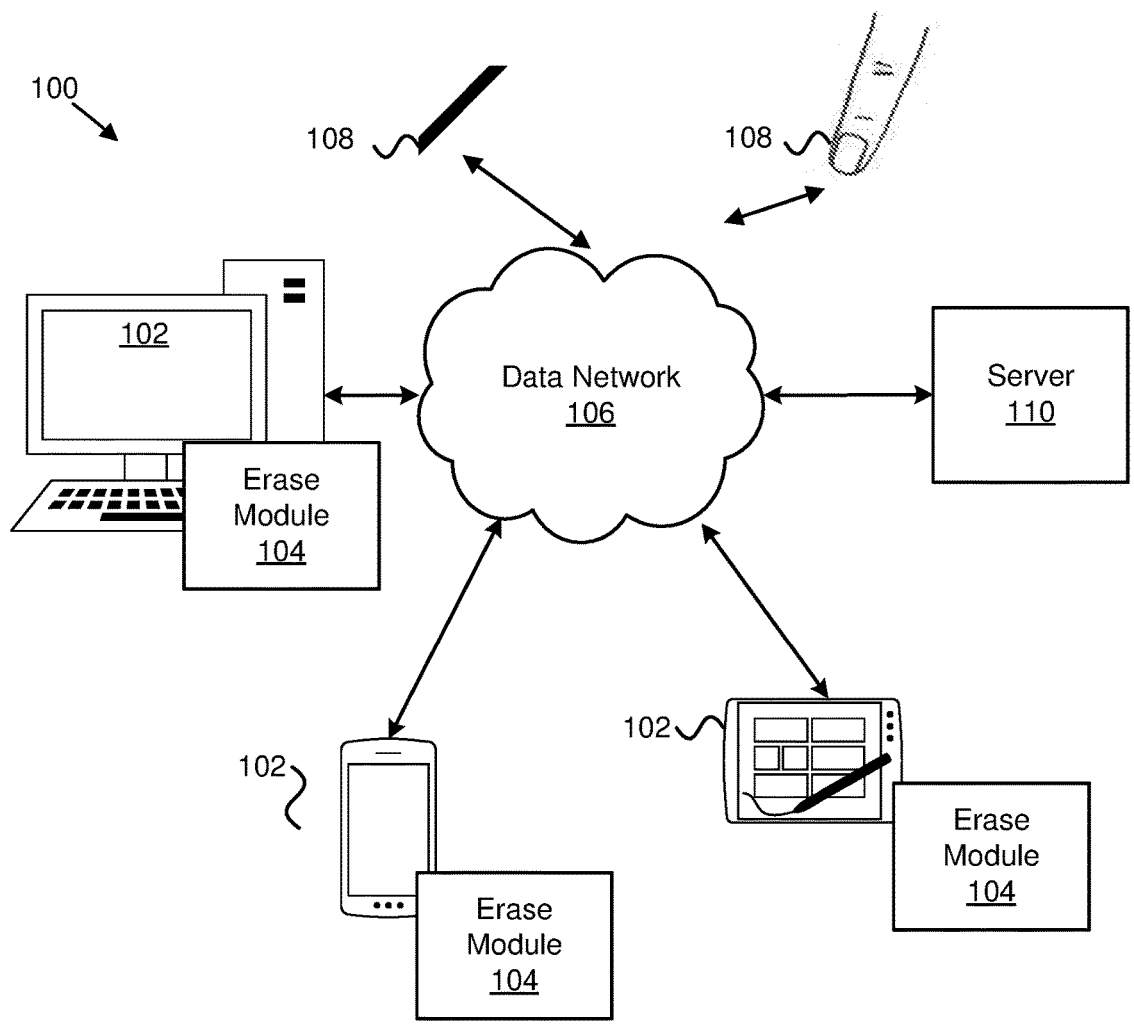
FIG. 1 is a schematic block diagram illustrating one embodiment of a system for erasing with a stylus.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for erasing with a stylus. In one embodiment, the system 100 includes information handling devices 102, erase modules 104, data networks 106, writing devices 108, and servers 110. Even though a specific number of information handling devices 102, erase modules 104, data networks 106, writing devices 108, and servers 110 are depicted in FIG. 1, one of skill in the art will recognize that any number of information handling devices 102, erase modules 104, data networks 106, writing devices 108, and servers 110 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, or the like. In some embodiments, the information handling devices 102 include wearable devices, such as smart watches, fitness bands, optical head-mounted displays, or the like.

The information handling devices 102 may include an embodiment of the erase module 104. In certain embodiments, the erase module 104 may determine an orientation of a stylus relative to a display. The erase module 104 may determine whether a touch event of the display occurs in response to the orientation of the stylus being in a substantially inverted position. The erase module 104 may also perform an erase function if the touch event occurs in response to the stylus being in the substantially inverted position. In this manner, the erase module 104 may be used to erase with a stylus.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

The writing device 108 may be any suitable writing device for writing on a touch-screen display. For example, the writing device 108 may be a stylus, a finger, and so forth. In one embodiment, the servers 110 include computing devices, such as desktop computers, laptop computers, mainframe computers, cloud servers, virtual servers, and/or the like. In some embodiments, the servers 110 are designed as application servers, email servers, database servers, file servers, game servers, home servers, media servers, web servers, and/or the like. In certain embodiments, the servers 110 store data related to an identified item, and may be designed to be accessed by one or more information handling devices 102 through the network 106. In certain embodiments, the servers 110 may include at least a portion of the erase module 104 and may perform one or more operations of the erase module 104.

Figure 2:
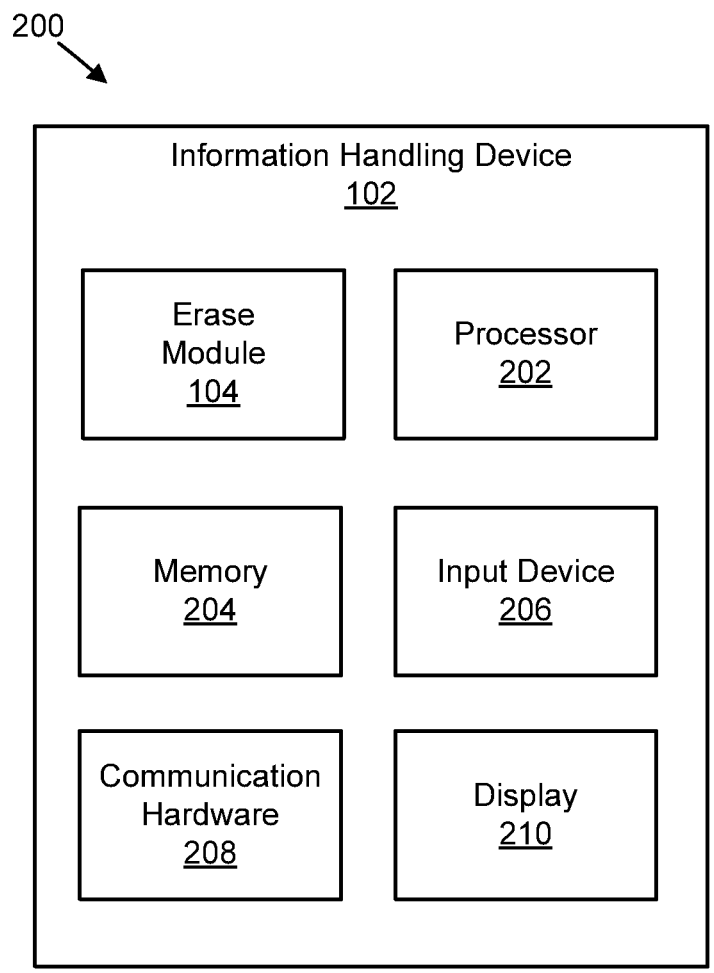
FIG. 2 is a schematic block diagram illustrating one embodiment of an apparatus including an information handling device.

FIG. 2 depicts one embodiment of an apparatus 200 with which a stylus may be used for erasing. The apparatus 200 includes one embodiment of the information handling device 102. Furthermore, the information handling device 102 may include the erase module 104, a processor 202, a memory 204, an input device 206, communication hardware 208, and a display 210. In some embodiments, the input device 206 and the display 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the erase module 104, the input device 206, the communication hardware 208, and the display 210.

The memory 204, in one embodiment, is a computer readable storage medium. In some embodiments, the memory 204 includes volatile computer storage media. For example, the memory 204 may include a random access memory (RAM), including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to an erase function. In some embodiments, the memory 204 also stores program code and related data, such as an operating system or other controller algorithms operating on the information handling device 102. The information handling device 102 may use the erase module 104 for erasing with a stylus.

As may be appreciated, the erase module 104 may include computer hardware, computer software, or a combination of both computer hardware and computer software. For example, the erase module 104 may include circuitry, or a processor, used to determine an orientation of the stylus. As another example, the erase module 104 may include computer program code that determines when to implement the erase function.

The input device 206, in one embodiment, may include any known computer input device including a touch panel, a button, a keyboard, a stylus, or the like. For example, the input device 206 may include the writing device 108. In some embodiments, the input device 206 may be integrated with the display 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display 210, in one embodiment, may include any known electronically controllable display or display device. The display 210 may be designed to output visual, audible, and/or haptic signals. In some embodiments, the display 210 includes an electronic display capable of outputting visual data to a user. For example, the display 210 may include, but is not limited to, an LCD display, an LED display, an OLED display, a projector, or similar display device capable of outputting images, text, or the like to a user. As another, non-limiting, example, the display 210 may include a wearable display such as a smart watch, smart glasses, a heads-up display, or the like. Further, the display 210 may be a component of a smart phone, a personal digital assistant, a television, a table computer, a notebook (laptop) computer, a personal computer, a vehicle dashboard, or the like.

In certain embodiments, the display 210 includes one or more speakers for producing sound. For example, the display 210 may produce an audible alert or notification (e.g., a beep or chime) upon initiating an erase function. In some embodiments, the display 210 includes one or more haptic devices for producing vibrations, motion, or other haptic feedback. For example, the display 210 may produce haptic feedback upon initiating an erase function.

In some embodiments, all or portions of the display 210 may be integrated with the input device 206. For example, the input device 206 and display 210 may form a touchscreen or similar touch-sensitive display. In other embodiments, the display 210 may be located near the input device 206. In certain embodiments, the display 210 may receive instructions and/or data for output from the processor 202 and/or the erase module 104.

Figure 3:
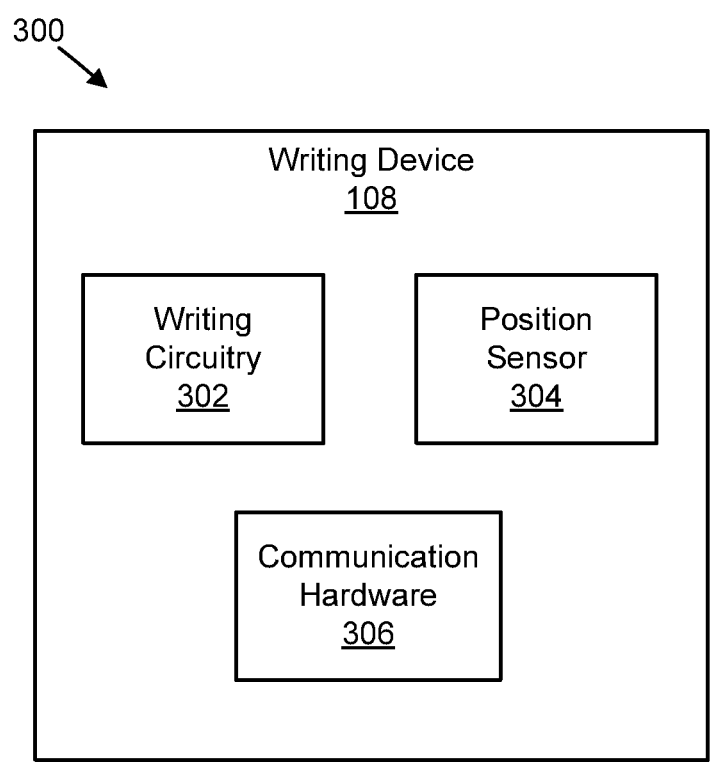
FIG. 3 is a schematic block diagram illustrating one embodiment of an apparatus including a writing device.

FIG. 3 depicts a schematic block diagram illustrating one embodiment of an apparatus 300 that includes one embodiment of the writing device 108. Furthermore, the writing device 108 includes writing circuitry 302, a position sensor 304, and communication hardware 306. The writing device 108 (e.g., stylus) has a first end and a second end. Moreover, the writing device 108 includes the writing circuitry 302 in the first end. Having the writing circuitry 302 in the first end enables the writing device 108 to perform a write function and/or to perform other functions. It should be noted that the second end of the writing device 108 does not require any circuitry similar to the writing circuitry 302, therefore, in some embodiments, the second end of the writing device 108 does not include any circuitry similar to the writing circuitry 302. The writing circuitry 302 in the first end may enable a write function in response to the orientation of the writing device 108 being in a substantially non-inverted position and the second end may enable the erase function in response to the orientation of the writing device 108 being in a substantially inverted position.

In some embodiments, the second end of the writing device 108 may include the position sensor 304, however, in other embodiments the second end of the writing device 108 does not include the position sensor 304. The position sensor 304 may be an accelerometer, a gyroscope, an altimeter, a wireless transceiver, a magnet, or any other suitable sensor used to provide data. In some embodiments, the position sensor 304 may include a camera system that provides data. In other embodiments, a camera system external to the writing device 108 may be used to provide data. The data from the position sensor 304 and/or external camera system may be used to determine an orientation of the writing device 108. For example, data from the position sensor 304 may be used to determine whether the orientation of the writing device 108 is in a substantially non-inverted position, or whether the orientation of the writing device 108 is in a substantially inverted position.

Figure 7:
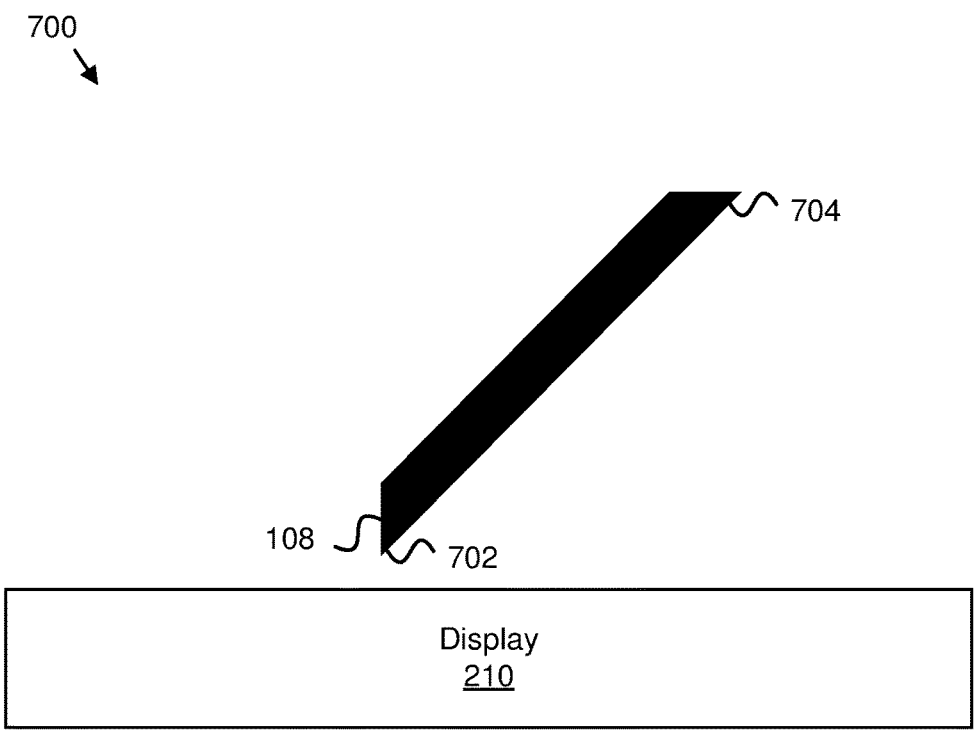
FIG. 7 is a schematic block diagram illustrating a non-inverted position of a stylus.
Figure 8:
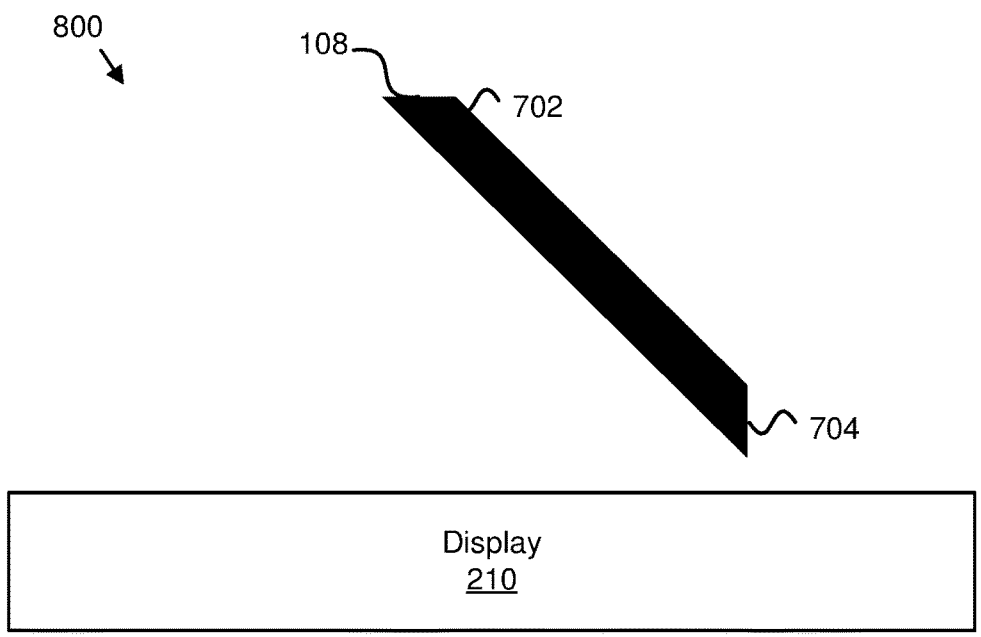
FIG. 8 is a schematic block diagram illustrating an inverted position of a stylus.

In certain embodiments, as illustrated in FIG. 7, a substantially non-inverted position 700 may mean that a first end 702 of the writing device 108 is closer to the touch-sensitive display 210 than a second end 704 of the writing device 108. In contrast, in such embodiments, as illustrated in FIG. 8, a substantially inverted position 800 may mean that the second end 704 of the writing device 108 is closer to the touch-sensitive display 210 than the first end 702 of the writing device 108.

The communication hardware 306 may facilitate communication with other devices. For example, the communication hardware 306 may enable communication via Bluetooth®, Wi-Fi, and so forth. In some embodiments, the communication hardware 306 may be used to determine the orientation of the writing device 108. In such embodiments, the position sensor 304 may be omitted.

Figure 4:
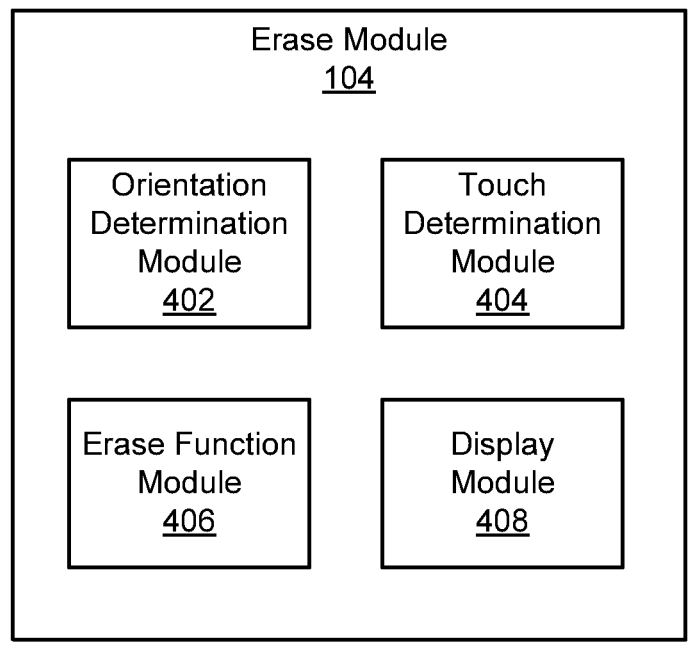
FIG. 4 is a schematic block diagram illustrating one embodiment of an apparatus including an erase module.

FIG. 4 is a schematic block diagram illustrating one embodiment of an apparatus 400 that includes one embodiment of the erase module 104. Furthermore, the erase module 104 includes an orientation determination module 402, a touch determination module 404, an erase function module 406, and a display module 408.

The orientation determination module 402 may be used to determine the orientation of the writing device 108. In certain embodiments, the orientation determination module 402 may receive data from the writing device 108 for use in determining the orientation of the writing device 108. For example, the orientation determination module 402 may receive a signal from the position sensor 304 of the writing device 108 and may determine the orientation of the writing device 108 using the signal from the position sensor 304. As another example, the orientation determination module 402 may determine the orientation of the writing device 108 based on a signal strength proximity estimate of wireless transmissions sent from the writing device 108. In such embodiments, a map of signal strength to touch location may be created and used to differentiate the signal strength.

As may be appreciated, the position sensor 304 may be located closer to the second end of the writing device 108 than to the first end of the writing device 108, or the position sensor 304 may be located closer to the first end of the writing device 108 than to the second end of the writing device 108. Using the signal strength and the location of the position sensor 304 relative to the writing device 108, an orientation of the writing device 108 may be determined. Using data received from the position sensor 304, the orientation determination module 402 may determine whether the writing device 108 is in a substantially inverted position or in a substantially non-inverted position.

The touch determination module 404 may be used to determine whether a touch event has occurred. In certain embodiments, a touch event may occur in response to the writing device 108, or any suitable object, touching the touch-sensitive display or being within a predetermined distance from the touch-sensitive display. The predetermined distance may be any suitable distance, such as being within a range of 3 to 10 mm, 5 to 20 mm, or 1 to 30 mm from the touch-sensitive display. In some embodiments, the touch event may include a back and forth motion of the writing device 108.

The erase function module 406 may be used to perform the erase function. For example, in response to the touch event occurring and in response to the writing device 108 being in a substantially inverted position, the erase function may be performed. In some embodiments, the erase function may be performed only in response to the touch event occurring and in response to the writing device 108 being in the substantially inverted position. Moreover, in certain embodiments, the erase function may be performed only if the touch event includes a back and forth motion of the writing device 108. The use of a back and forth motion of the writing device 108 may compensate for any latency between the writing device 108 and an information handling device 102.

The erase function may be used to remove data displayed on the touch-sensitive display. In certain embodiments, a visual and/or audible indication may be used to indicate to a user that the erase function is being performed. For example, a sound indicating an erase function may be made, such as a sound that a physical eraser makes in response to an actual erase being performed on paper. As another example, a visual indicator may be displayed on the touch-sensitive display, such as a representation of an eraser, an icon, smudge marks, eraser residue, instructions on erasing, and so forth. As may be appreciated, the smudge marks and eraser residue may be similar to marks that appear in response to a user erasing using a physical eraser and paper. The instructions on erasing may provide information to the user regarding how to make a better erase, such as suggesting that the user use a back and forth motion. The display module 408 may be used to display the visual indicator.

Figure 5:
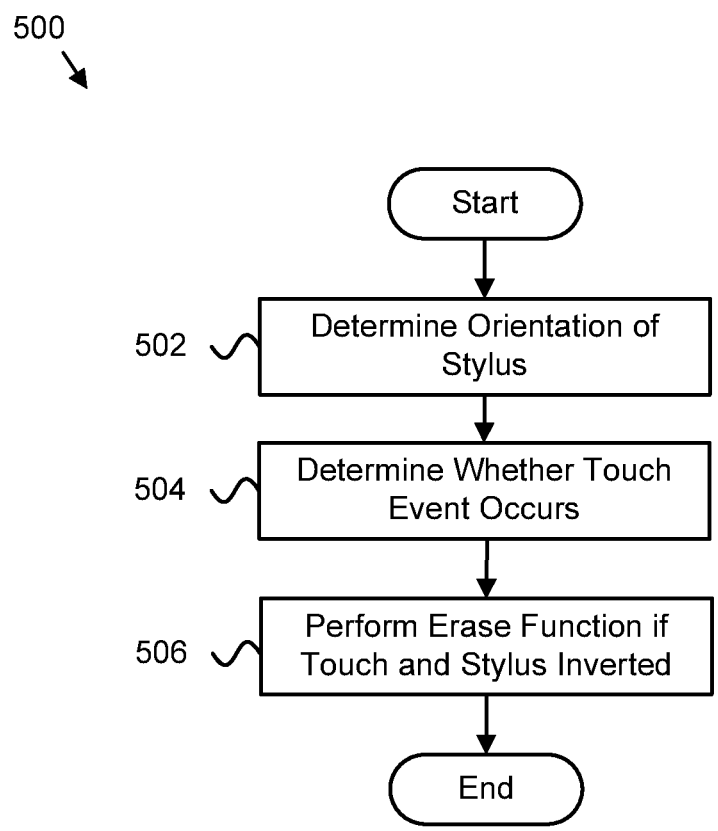
FIG. 5 is a schematic flow chart diagram illustrating one embodiment of a method for erasing with a stylus.

FIG. 5 is a schematic flow chart diagram illustrating one embodiment of a method 500 for erasing with a stylus. In some embodiments, the method 500 is performed by a tablet device, such as the information handling device 102. In other embodiments, the method 500 may be performed by a module, such as the erase module 104. In certain embodiments, the method 500 may be performed by a processor executing program code, for example, a microcontroller, a microprocessor, a central processing unit (CPU), a graphics processing unit (GPU), an auxiliary processing unit, a field programmable gate array (FPGA), or the like.

The method 500 may include determining 502 an orientation of a stylus relative to a touch-sensitive display. For example, the orientation of the stylus may indicate that the stylus is perpendicular to the touch-sensitive display, parallel to the touch-sensitive display, or at some angle in-between. The method 500 may also include determining 504 whether a touch event of the touch-sensitive display occurs in response to the orientation of the stylus being in a substantially inverted position. In certain embodiments, the method 500 determining 504 whether a touch event of the touch-sensitive display occurs also determines whether the stylus, another object, or some combination thereof, is touching the touch-sensitive display or is within a predetermined distance from the touch-sensitive display. In some embodiments, the touch event may include a back and forth motion of the stylus, similar to the motion that may be used when a physical eraser is erasing something from paper.

The stylus may include a first end having writing circuitry and a second end. The first end of the stylus may enable a write function in response to the orientation of the stylus being in a substantially non-inverted position and the second end of the stylus may enable the erase function in response to the orientation of the stylus being in the substantially inverted position. As may be appreciated, the substantially non-inverted position may include the first end of the stylus being closer to the touch-sensitive display than the second end of the stylus. Furthermore, the substantially inverted position may include the second end of the stylus being closer to the touch-sensitive display than the first end of the stylus.

The method 500 may perform 506 the erase function if the touch event occurs in response to the stylus being in the substantially inverted position. Moreover, the erase function may include removing data from the touch-sensitive display, removing text from the touch-sensitive display, removing one or more lines from the touch-sensitive display, removing part of a drawing from the touch-sensitive display, and so forth. As may be appreciated, the touch event may be performed by any object, such as a finger, as long as the stylus is in the substantially inverted position. Then the method 500 may end.

Figure 6:
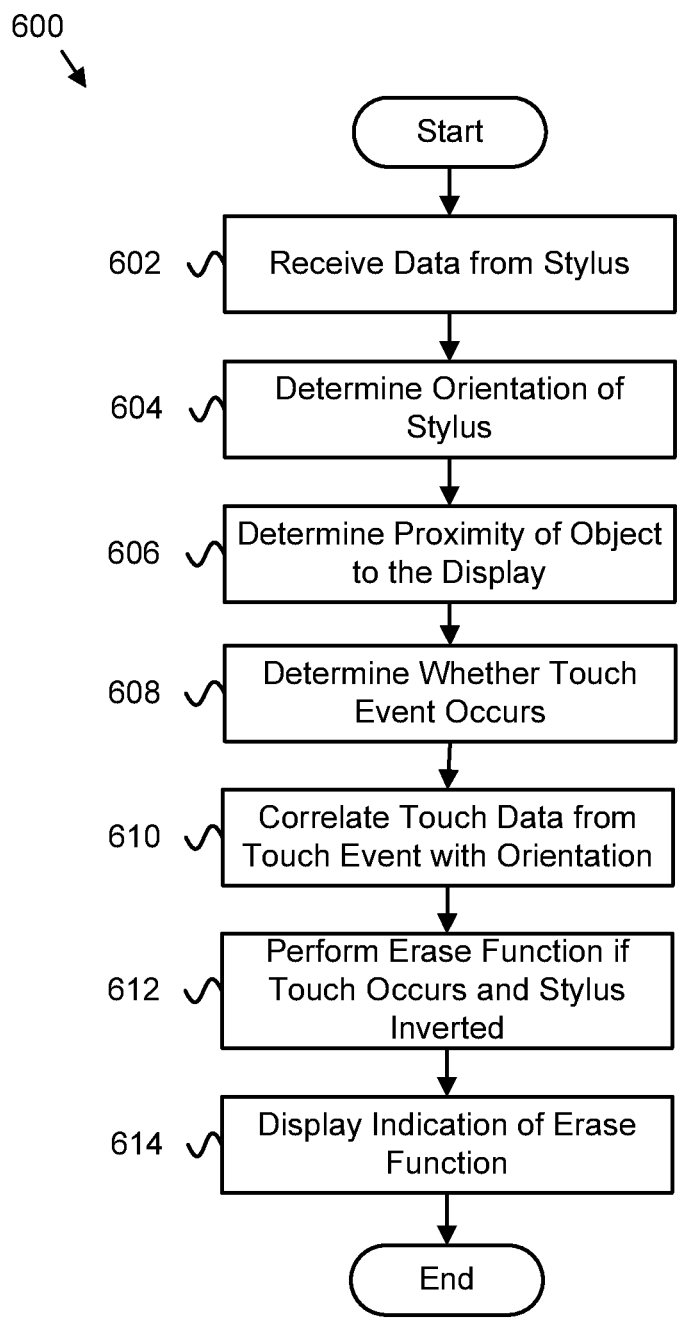
FIG. 6 is a schematic flow chart diagram illustrating another embodiment of a method for erasing with a stylus.

FIG. 6 is a schematic flow chart diagram illustrating another embodiment of a method 600 for erasing with a stylus. In some embodiments, the method 600 is performed by a tablet device, such as the information handling device 102. In other embodiments, the method 600 may be performed by a module, such as the erase module 104. In certain embodiments, the method 600 may be performed by a processor executing program code, for example, a microcontroller, a microprocessor, a central processing unit (CPU), a graphics processing unit (GPU), an auxiliary processing unit, a field programmable gate array (FPGA), or the like.

The method 600 may begin by receiving 602 data from the stylus, such as from a sensor of the stylus. For example, data may be received 602 from a gyroscope, an accelerometer, an altimeter, a wireless transceiver, a camera system, or any other suitable sensor of the stylus. The method 600 may also determine 604 the orientation of the stylus relative to the touch-sensitive display using the data. In certain embodiments, the method 600 may determine 606 a proximity of the stylus, another object, or some combination thereof to the touch-sensitive display, such as determining whether the stylus, another object, or some combination thereof is within a predetermined distance from the touch-sensitive display. Furthermore, the method 600 may determine 608 whether a touch event of the touch-sensitive display occurs in response to the orientation of the stylus being in a substantially inverted position. In some embodiments, the method 600 may correlate 610 data corresponding to the touch event with the orientation of the stylus relative to the touch-sensitive display to determine whether the touch event occurs in response to the orientation of the stylus being in the substantially inverted position.

The method 600 may perform 612 the erase function if the touch event occurs in response to the stylus being in the substantially inverted position. Moreover, the method 600 may display 614 an indication to the touch-sensitive display indicating that the erase function is being performed. The indication may be a representation of an eraser, an icon, smudge marks, eraser residue, instructions on erasing, and so forth. Then the method 600 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a stylus;
   a touch-sensitive display;
   a processor;
   a memory that stores code executable by the processor, the code comprising:
      code that determines an orientation of the stylus relative to the touch-sensitive display;
      code that determines whether a touch event of the touch-sensitive display occurs; and
      code that performs an erase function in response to the touch event occurring via a finger performing a back and forth motion on the touch-sensitive display concurrently with the orientation of the stylus being in an inverted position, wherein the stylus further comprises a first end and a second end, the first end enabling a write function in response to the orientation of the stylus being in a non-inverted position, and the second end enabling the erase function in response to the orientation of the stylus being in the inverted position, and wherein the non-inverted position further comprises the first end being closer to the touch-sensitive display than the second end, and the inverted position further comprises the second end being closer to the touch-sensitive display than the first end, and wherein the stylus comprises a sensor selected from the group consisting of a gyroscope, an accelerometer, and an altimeter, and the use of the erase function is determined solely using the sensor.

2. The apparatus of claim 1, wherein the code further comprises code that receives data from the sensor of the stylus, and wherein the data is used in determining the orientation of the stylus.

3. The apparatus of claim 1, wherein the code further comprises code that displays an indication to the touch-sensitive display indicating that the erase function is being performed.

4. A method comprising:
   determining, by use of a processor, an orientation of a stylus relative to a display;
   determining whether a touch event of the display occurs; and
   performing an erase function in response to the touch event occurring via a finger performing a back and forth motion on the display concurrently with the orientation of the stylus being in an inverted position, wherein the stylus further comprises a first end and a second end, the first end enabling a write function in response to the orientation of the stylus being in a non-inverted position, and the second end enabling the erase function in response to the orientation of the stylus being in the inverted position, and wherein the non-inverted position further comprises the first end being closer to the display than the second end, and the inverted position further comprises the second end being closer to the display than the first end, and wherein the stylus comprises a sensor selected from the group consisting of a gyroscope, an accelerometer, and an altimeter, and the use of the erase function is determined solely using the sensor.

5. The method of claim 4, further comprising receiving data from the sensor, wherein the data is used in determining the orientation of the stylus.

6. The method of claim 4, further comprising determining whether the stylus is in the inverted position.

7. The method of claim 4, further comprising providing an indication that the erase function is being performed.

8. The method of claim 7, wherein providing the indication that the erase function is being performed further comprises displaying the indication on the display.

9. A program product comprising a non-transitory computer readable storage medium that stores code executable by a processor, the executable code comprising code to perform:
   determining an orientation of a stylus relative to a display;
   determining whether a touch event of the display occurs; and
   performing an erase function in response to the touch event occurring via a finger performing a back and forth motion on the display concurrently with the orientation of the stylus being in an inverted position, wherein the stylus further comprises a first end and a second end, the first end enabling a write function in response to the orientation of the stylus being in a non-inverted position, and the second end enabling the erase function in response to the orientation of the stylus being in the inverted position, and wherein the non-inverted position further comprises the first end being closer to the display than the second end, and the inverted position further comprises the second end being closer to the display than the first end, and wherein the stylus comprises a sensor selected from the group consisting of a gyroscope, an accelerometer, and an altimeter, and the use of the erase function is determined solely using the sensor.

10. The program product of claim 9, wherein the code further comprises code to perform receiving data from the stylus, and wherein the data is used in determining the orientation of the stylus.

\* \* \* \* \*